May 19, 1936.   F. J. BUCHER   2,041,112
CABINET PANEL BOARD UNIT
Filed March 3, 1934   3 Sheets-Sheet 1

INVENTOR
Fred J. Bucher
By Green & McCallister
His Attorneys

May 19, 1936.  F. J. BUCHER  2,041,112
CABINET PANEL BOARD UNIT
Filed March 3, 1934   3 Sheets-Sheet 3
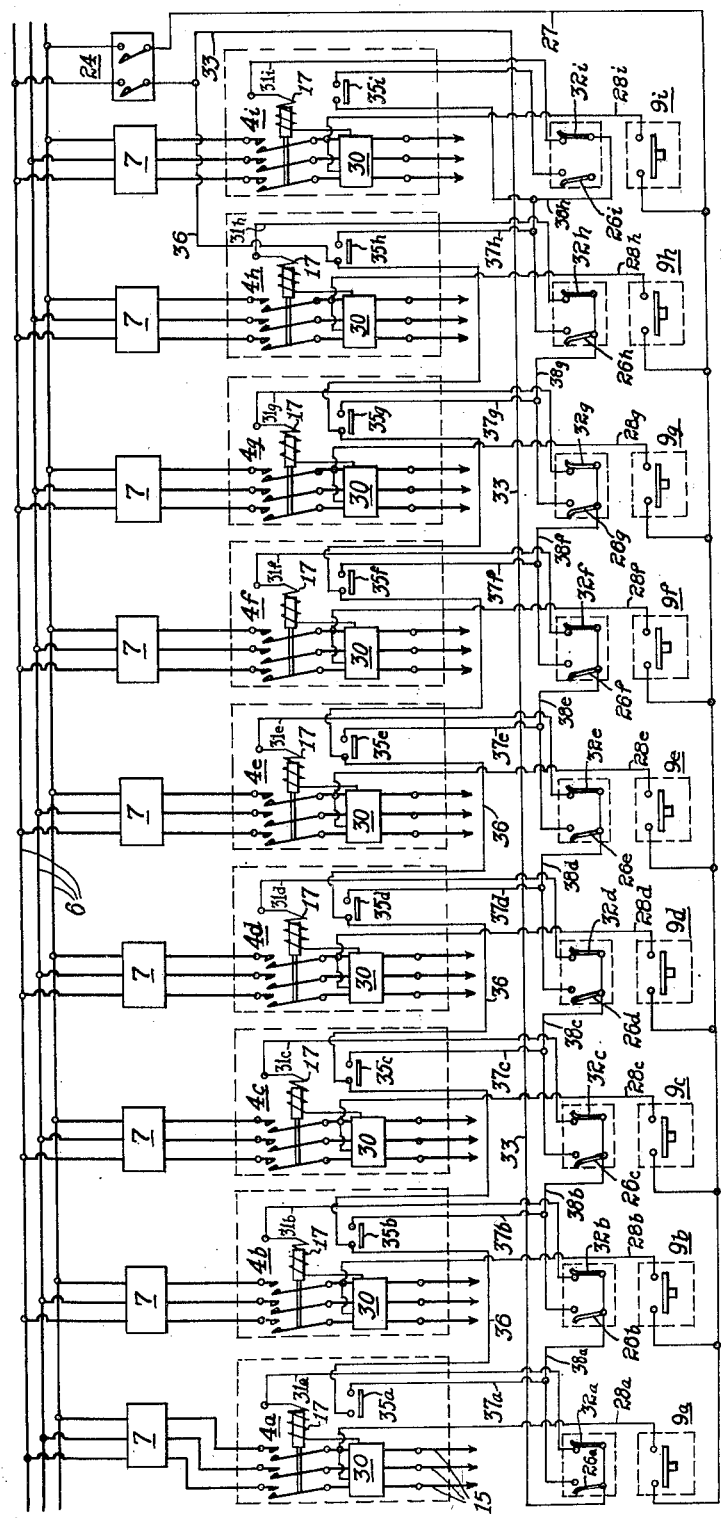
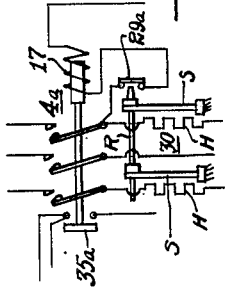
INVENTOR
Fred J. Bucher
By Green & McCalliste
His Attorneys Patented May 19, 1936

2,041,112

UNITED STATES PATENT OFFICE 2,041,112

CABINET PANEL BOARD UNIT

Fred J. Bucher, Pittsburgh, Pa.

Application March 3, 1934, Serial No. 713,853

6 Claims. (Cl. 175—298)

This invention relates to apparatus for controlling the distribution of power from the power supply to a plurality of power consuming circuits, and for protecting each of the circuits, and more particularly to a unitary cabinet provided with the necessary means for connecting or disconnecting the power consuming devices to or from the power supply, control means, and protective apparatus for such devices. All of this equipment is assembled in the cabinet and wired complete at the factory to form an integral distribution and control group which, when placed in a mill, shop or factory, may be put in operation with a minimum expenditure of time and labor by merely connecting the power consuming devices to their respective operating devices.

Integral distribution and control groups embodying this invention are designed as complete, permanent groups to suit particular applications rather than groups made up of individual self-supporting switchboard sections to be assembled in the factory or in the field, for use in factories, shops or mills where a relatively large number of motors or other electric power consuming devices are so located that power may be distributed from the source of power supply to the motors or power consuming devices and controlled from such units. By assembling the disconnecting devices and the operating devices with their control means in a single, multiple compartment cabinet, the space requirements, assembly cost, wiring cost and danger of failure will be considerably less than with individual unit groups assembled and wired at the factory or in the field. The only work required to be done at the place where it is to be used is to mount a group at a point most convenient to all of the power consuming devices, connect the bus bars of the unit to the power supply, and to connect the various operating devices of the unit to the various power consuming devices to be served thereby. With this type of construction, the buyer is saved the expense of preparing elaborate drawings of the assembly, wiring diagrams of circuits involved, and the necessity of hiring skilled labor for the installation.

An object of this invention is the provision of an integral distribution and control group that may be completely equipped and assembled in a single multiple compartment cabinet at the factory so that all that remains to be done, at the point where the group is to be set up for use, is to connect the bus bars of the group to the power supply and to connect the operating devices to the various power consuming devices to be served.

Another object of this invention is the provision of an integral distribution and control group completely assembled and wired at the factory, all necessary disconnecting, operating and control devices being mounted in a single multiple compartment cabinet dimensioned to suit each particular installation rather than an assembly of individually self-supporting sections, thereby reducing the cost of the group, the weight, and mostly the space requirements.

Another object is the provision of an integral distribution and control group in which any standard operating devices, control equipment and protective devices, suitable for use in this type of multiple compartment cabinet, may be utilized with decided advantages in economy of manufacture, convenience of operation, and connection to the power supply and to the power consuming devices, and with decided savings in the cost of installation and maintenance over the use of individually enclosed disconnecting and control apparatus assembled and wired on a unit frame at the factory, or the same apparatus scattered about the plant in a more or less haphazard manner.

Another object is the provision of a distribution and control group in which individual devices already owned by the user, and which can be fitted into compartments of the group, may be utilized in the manufacture of the distribution and control group.

A further object is the provision of a distribution and control group in which new or used devices of any manufacture, which can be fitted into compartments of the unit cabinet, may be utilized to suit the particular preference of the user, whether such devices be furnished by the user to the manufacturer of the distribution and control group, or furnished by the latter.

Other objects of the invention will, in part, be apparent, and will, in part, be obvious from the following description taken in conjunction with the accompanying drawings, in which:

Fig. 4 is a diagrammatic view of the control circuits and the push button switches embodied in the panel board shown in Figs. 1 and 3; and Fig. 5 is a diagrammatic view of one of the operating devices shown schematically in Figs. 3 and 4.

Throughout the drawings and specification, like reference characters indicate like parts.

Figure 1:
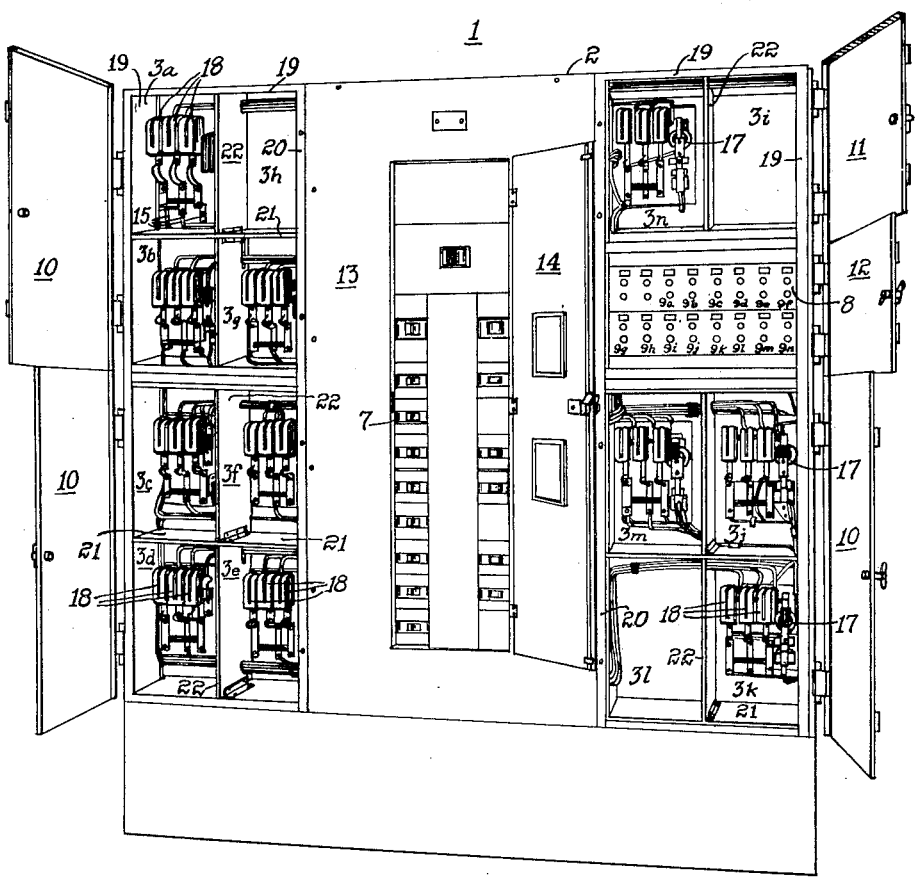
Figure 1 is a front view in perspective of an integral distribution and control group embodying one form of the invention.

In Fig. 1 of the drawings, an integral distribution and control group 1 is illustrated, that comprises a cabinet 2 having a plurality of separate compartments 3a to 3n in which, except compartments 3h, 3i and 3l, operating devices 4a to 4g, 4j, 4k and 4m are housed; a compartment 5 in which the main bus bars 6, protective devices 7 (one for each operating device) and the circuit connections of devices 7 from the bus bars to the control devices are housed; and a compartment 8 having therein push button switches 9a to 9m, by means of which the operating devices may be controlled at will.

The operating device compartments are provided with doors 10 and 11 which may be opened or closed and when closed, render these compartments substantially dustproof. The compartment which houses the push button switches is provided with a door 12 that may be opened or closed at will and this door also when closed, renders this compartment substantially dustproof.

The compartment that houses the protective devices, bus bars and the circuit conductors running from the bus bars to the operating devices is closed by a plate 13 which is preferably secured in place with screws or bolts. An opening is formed in this plate to provide accessibility to the protective devices; and this opening may be covered or uncovered by means of a hinged cover or door 14.

With the type of construction above described, it is apparent that all of the electrical apparatus involved is completely housed and protected from dust which is essential to reliable operation.

The operating devices 4, bus bars 6, protective devices 7 and the push button switches 9a to 9n, are all mounted in their respective compartments and wired complete at the factory so that all that remains to be done in the field is to place the distribution and control group at the desired location in the shop, factory, or mill, connect the power supply to the bus bars of the group, and each of the operating devices to the particular electric translating devices to be supplied with power.

Figure 3:
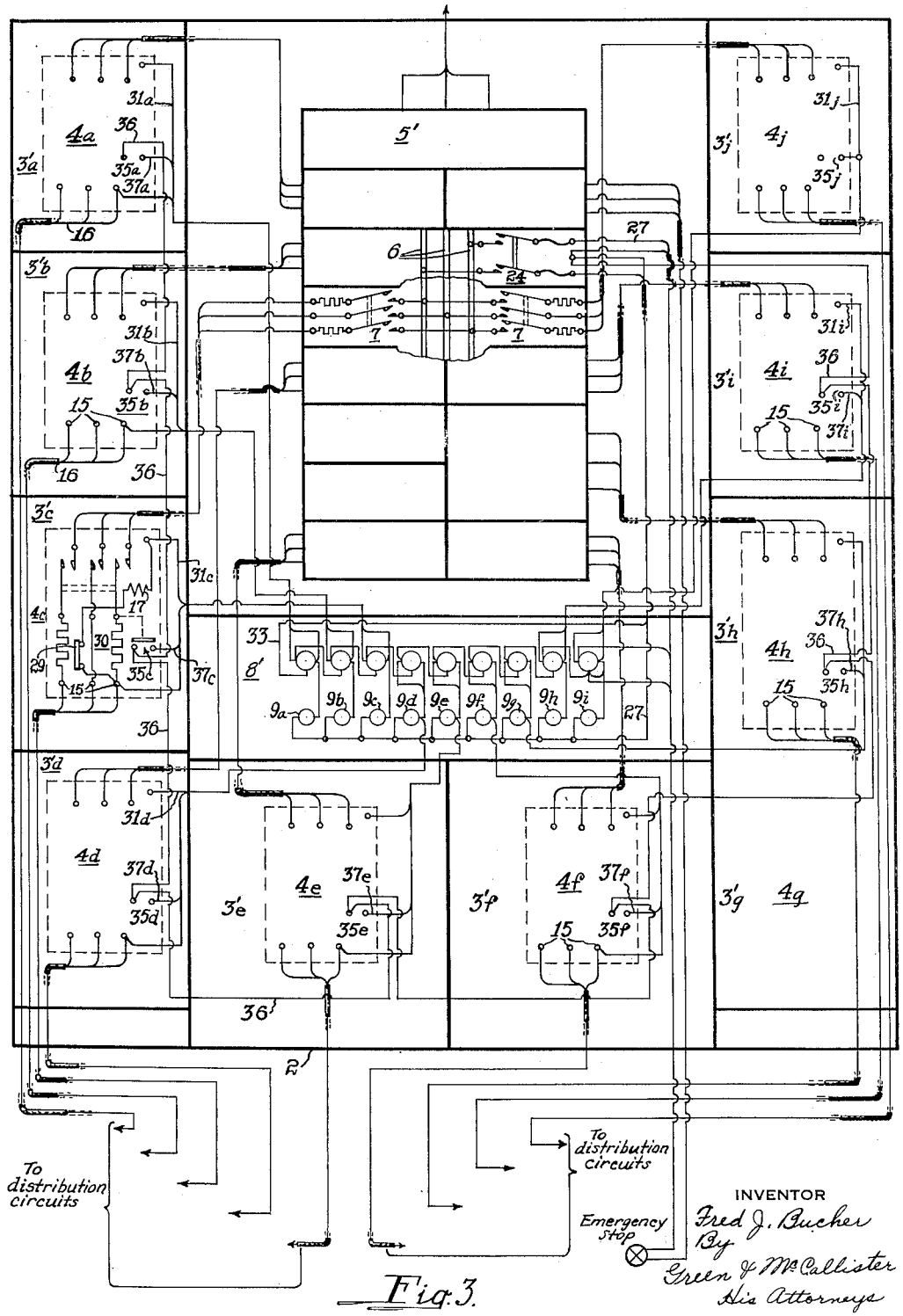
Fig. 3 is a more or less diagrammatic front elevation view of a cabinet and the electrical apparatus therefor; the electrical apparatus and circuits being diagrammatically illustrated, and the cabinet being of the form shown in Fig. 2.

The power supply may be connected to the bus bars 6 at the top of the cabinet, as indicated in Fig. 3, and from these bus bars, power is distributed by the various disconnecting devices or combination interrupting and distributing devices to the various operating devices involved.

The connections to the power consuming devices are made from terminals 15 connected to the movable contact jaws or members of the operating devices. The conductors leading from these terminals to the power consuming devices are taken downwardly through the various compartments along the back of the cabinet as is clearly shown in Fig. 1, through the bottom of the cabinet and thence to a motor or other power consuming device.

The conductors leading to the various power consuming devices or motors may be enclosed in conduits 16, these conduits being indicated schematically in Fig. 3. As indicated in Fig. 3, substantially all of the conductors involved in the distribution and control circuits may be housed in conduits to segregate and support the conductor groups.

In most cases, the cabinet or the control center would be used in plants where a number of motors are to be supplied with power and their operation governed from a central control point. Where this is the field of use, the cabinet board is mounted in a location most convenient to the group of motors or distribution circuits involved.

With this type of control center, it is apparent that the expense of connecting the power supply to the particular distribution circuits is relatively slight in that a relatively small amount of work is involved since all of the complicated and elaborate control circuits required for the operation of the operating devices 4 are developed and completed at the factory where adequate facilities and skilled workmen are available.

In the drawings, operating devices 4a to 4n are illustrated as being electric contactors of the three-pole type operated by a solenoid or magnet coil 17. The contactor jaws are not shown or visible in Fig. 1, but are diagrammatically shown in Figs. 3 and 4. In Fig. 1, each of the contactor jaws are hidden from view by the arc extinguishers or "blow-outs" 18. So far as this invention is concerned, the particular type of contactor employed as an operating device is immaterial, as it is proposed to employ standard contactors of the particular type required for controlling the distribution of current from a power distribution circuit to a power consuming device. Instead of contactors, the operating devices may consist of motor starters of the automatic type, or of the type referred to in the art as "across-the-line" motor starters.

In a preferred form of control group, it is proposed to mount the bus bars 6 at the back of compartment 5 and to space them symmetrically about the vertical center line of the cabinet so that the operating devices may be placed in compartments spaced symmetrically on either side of, or on either side of and below the bus bar and distributing compartment 5. This arrangement simplifies the connections from the bus bars to the operating devices, and the layout of the control circuits and the push button switches provided for energizing or deenergizing the solenoids or magnet coils which open or close the operating devices.

In this type of cabinet panel board, it is not necessary that each of the operating devices be of the same capacity, as the capacity of each contactor or operating device would be governed by the capacity of the particular power consuming device to which it is to be connected.

As illustrated in Fig. 1, the group of push button switches 9a to 9n is located to one side of the compartment 5, and as shown in Fig. 3, this group of push button switches is located in the lower central part of the cabinet below the group of protective devices, but it is not necessary that this group be assembled in the cabinet. The push button switches may be outside the cabinet, but for convenience and for the reason that the control circuits associated with these push button switches may be more easily and simply devised when located inside the cabinet, these switches are located in the cabinet and preferably in the middle portion thereof between the groups of operating devices located in compartments on each side of the cabinet.

The construction of the cabinet may vary in the matter of structural details and in its simplest form comprises an outer box-like sheet metal shell, the top, bottom, sides, and back of which are lined with relatively thick slabs 19 of composition material which is fireproof and possesses the electric insulating properties required. Adjacent each side of the cabinet, a vertical slab 20 is provided and the spaces between these slabs and the opposite side walls are sub-divided into the operating device compartments 3a to 3n by means of vertically spaced horizontal shelves 21 and vertical partitions 22, preferably of fireproof insulating material. In Fig. 1, the compartment which houses the push button switches 9a to 9n occupies the space which would ordinarily be required for two operating device compartments.

Figure 2:
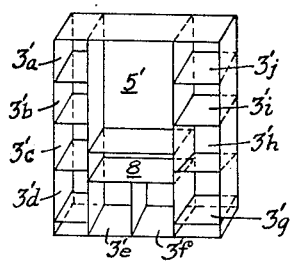
Fig. 2 is a more or less diagrammatic perspective view of a slightly modified form of cabinet in which the operating devices, protective devices, and control apparatus, shown in Fig. 1, may be mounted.

In Fig. 2, a modified form of cabinet is diagrammatically illustrated in perspective. At each side of the cabinet a single row of vertically spaced operating device compartments is formed, and provided at its bottom with two operating device compartments, these compartments being designated as 3'a to 3'j. The space between the vertical rows of operating device compartments is subdivided into one relatively large compartment 5' which would contain the circuit protective devices for the operating devices and the bus bars referred to in connection with Figs. 1 and 3, and a compartment 8' for the group of push button switches 9a to 9j.

In Fig. 3 of the drawings, a cabinet of the same general design as that illustrated in Fig. 2 is shown which is provided with electrical apparatus and control circuits of the character referred to in connection with Fig. 1, the apparatus being illustrated schematically.

Since the operating devices illustrated, are all identical in construction, one of these devices has been completely illustrated in a schematic manner in Fig. 5. The protective devices 7 may be circuit breakers, fuses, or fused knife switches, and in the drawings these devices are shown as circuit breakers.

When a protective device 24 for the control circuits is closed, the various operating devices may be actuated by closing the particular push button switch governing the circuit of the particular operating device to be closed. As, for example, by closing push button switch 9a the operating solenoid 17 for operating device 4a is energized, closing the contact members thereof, whereby the distribution circuit connected to this operating device is connected to the bus bars 6 which, as stated previously herein, are connected to the source of power supply.

In some industrial applications to which the cabinet herein illustrated may be applied, the operating devices of the cabinet may be connected to a group of motors that operate machines utilized in a particular process that requires a complete shutdown of all the motors in case one of the machines should fail or for some reason it should be necessary to stop a particular machine in the group. Also, the nature of the machines involved in the process may require that the several machines be started and stopped in a particular sequence. In order to take care of such conditions of operation, a group of selector switches 26a to 26n is provided and connected in circuit with the various push button switches 9a to 9n. These selector switches when placed in one position, make possible the sequential starting of the motors controlled by the operating devices, and in order to start the sequence a particular one of the operating devices must be closed first before any of the others can be closed. In the arrangement illustrated in the drawings, the control circuits for the operating devices are so arranged that unless push button switch 9a is first closed to thereby close operating device 4a, energizing circuits for the actuating coils of the other operating devices cannot be established. These selector switches are so designed that the operating devices may be operated selectively and at will, and independently of any other operating device by merely closing the push button switch included in the circuit for the operating coil of the operating device to be closed.

The operation of the system when arranged for sequential closing of the operating devices 4a to 4n, may be readily understood from Figs. 3, 4, and 5. When push button switch 9a is closed momentarily, a circuit is established for actuating coil 17 of operating device 4a that extends from one of the bus bars 6 through switch 24, conductor 27, which is connected to one side of all of the push button switches 9a to 9n, switch 9a, conductor 28a to one of the terminals 15 of operating device 4a, normally close contact members 29 of an overload protective relay 30, the actuating coil 17, conductor 31a, a normally closed push button switch 32a, conductor 33 to switch 24 and another of bus bars 6. The actuating coil being energized, operating device 4a closes, establishing a holding circuit for coil 17, because the terminal thereof which was connected through push button switch 9a to bus bar 6 is now connected to the same bus bar through one of the pairs of contact jaws of the operating device.

Also, on the closure of device 4a, an interlock 35a is closed, connecting one of bus bars 6 to normally closed switch 32a disposed in the control circuit for the coil of operating device 4b, via conductor 36, interlock 35a, and conductors 37a and 38a. At this point it is to be noted that conductors 33 and 36 are connected to the same bus bar, conductor 33 connecting switches 26a and 32a to the bus bar, and conductor 36 connecting one side of all the interlocks 35a to 35n to this bus. Since one side of actuating coil 17 for device 4b is connected to one of bus bars 6 when interlock 35a is closed, the closure of push button switch 9b, energizes coil 17 which closes operating device 4b and establishes the holding circuit for the coil of this device.

When device 4b closes, its interlock 35b closes, connecting one of bus bars 6 to switch 32c and to one side of coil 17 of device 4c, so that device 4c may be closed by merely closing push button switch 9c. In this manner the actuating coils of devices 4a to 4n may be closed in sequence in the order above described. In order to simplify the circuit, corresponding conductors in each of the circuits are designated by the same reference character as applied to the circuit for device 4a, with different subscripts, the order of the subscripts indicating the sequence of operation.

From the above description of the circuits for the actuating coils of the operating devices 4a to 4n, it is apparent that to open the devices, these circuits must be broken and this is accomplished by opening the energizing circuits for the actuating coils or solenoids thereof. If switch 32a is opened, the energizing circuits for all of the operating coils or solenoids 17 are broken the moment interlock 35a opens, because all coils are thereby disconnected from conductor 36 which is energized by reason of its connection to one of bus bars 6. If any of the switches to the right of switch 32a is opened, only the actuating coils or solenoids controlled by the push button switches beyond the switch actually opened are deenergized. For example, if switch 32e is opened, the actuating coils for devices 4e to 4n are opened, but devices 4a to 4d remain closed as the interlocks of the operating devices 4a to 4d maintain the energizing circuits for coils 17 thereof.

When selective, instead of sequential operation of the operating devices is desired, switches 26a to 26d are closed, whereby the normally closed push button switches 32a to 32n are all connected by conductors 38a to 38n, inclusive, to the conductor 33 which of course, is connected to one of bus bars 6. Therefore, if any of push button switches 9a to 9n is closed, regardless of sequence or the number of switches closed, the operating device or devices controlled by that push button switch or switches will close. This is possible because switches 26a to 26n when closed, bridge or shunt the interlocks 35a to 35m of the operating devices 4a to 4n, respectively.

The overload protective relays 30 illustrated in connection with the operating devices are for the purpose of protecting the motors or other apparatus connected thereto, and herein designated as distribution circuits, from sustained overloads. These relays, as shown in Fig. 5, comprise a normally closed switch connected in series circuit with an operating coil 17, and a pair of bimetallic strips S which are heated by heater elements H connected in series with two of the distribution conductors leading from the operating device. When an overload has persisted for a definite length of time, either one or both of the bimetallic members will flex and move a push rod R towards and against switch 29 and open the same whereby the actuating coil is deenergized and the operating device opened.

Having thus described the invention, it will be apparent to those skilled in this art that various modifications and changes may be made in the arrangement of the apparatus mounted in the cabinet without departing either from the spirit or scope of the invention. It is desired, therefore, that only such limitations shall be placed on the invention as are imposed by the prior art and the appended claims.

What I claim as new and desire to secure by Letters Patent is:

1. A power distribution and control group for distributing electric power from a power supply source to the power consuming devices of an industrial plant or to a particular unit or portion of the devices of such plant, comprising a cabinet having a plurality of compartments therein for housing all of the equipment essential for the protection, control, and distribution of power to said power consuming devices, certain of said compartments having electric starters therein provided with operating solenoids, certain others of said compartments having protective devices therein in circuit with the starters, and a compartment provided with push button start and stop switches connected in circuit with the operating solenoids for energizing or deenergizing the operating solenoids of the starters, said cabinet and equipment being designed to be completely assembled and connected at the place of manufacture to be ready for use at the place of installation.

2. In a power distribution and control group of the factory assembled type containing all the apparatus essential for the protection, control, and distribution of power to all the power consuming devices of an industrial plant or all of the power consuming devices of a particular section or unit of such plant, and requiring merely the connection of its bus bars to the power supply and the connection of the electric power consuming devices thereto, comprising a cabinet having the aforesaid essential apparatus therein, and characterized by the fact that the cabinet has a centrally located compartment in which bus bars are housed; that a plurality of compartments spaced symmetrically to either side of said bus bar compartment each houses an electric contactor provided with an electromagnet for operating the same and disposed for connection to a power consuming device; that the cabinet contains compartments having therein protective circuit interrupting devices in circuit with the bus bars and said contactors; that the cabinet contains a compartment having push button switches for selectively energizing or deenergizing said operating electromagnets; and that the cabinet is provided with covers for closing said compartments.

3. A power distribution and control group for distributing electric power from a power supply source to a plurality of power consuming devices, of an industrial plant or to a particular unit or portion of the devices of such a plant comprising a single unit, box-like cabinet having a compartment for a plurality of branch disconnecting and protective devices and bus bars, a plurality of compartments each disposed to house a magnetically operated operating device, a compartment for a plurality of control devices, partitions between said compartments, hinged or bolted-on covers over the front of said compartments, and tapped connections for rigid conduit or flexible steel conduit connectors on the bottom, top or ends of the cabinet for incoming or outgoing wiring, the cabinet being arranged to stand on the floor, or to be fastened on a wall.

4. A power distribution and control group for distributing power from a supply source to the power consuming devices of an industrial plant or to a particular unit or portion of the devices of such a plant, comprising a box-like cabinet having a plurality of compartments therein for housing all of the equipment essential for the protection, control, and distribution of power to said power consuming devices, characterized by the fact that one compartment of said cabinet contains a plurality of disconnecting and protective devices and bus bars; that a plurality of individual compartments of said cabinet each contains a magnetically operated operating device; that at least one compartment of said cabinet contains a plurality of control devices arranged to effect selective operation of said operating devices; that the front of said cabinet is provided with covers to close said compartments; and that said cabinet is provided with tapped connections for conduit conductors to accommodate wiring from the supply source to the bus bars and outgoing wiring running from the various operating devices to the various power consuming devices.

5. A power distribution and control group for distributing power from a supply source to the power consuming devices of an industrial plant or to a particular unit or portion of the devices of such a plant, comprising a box-like cabinet having a plurality of compartments therein for housing all of the equipment essential for the protection, and distribution of power to said power consuming devices, characterized by the fact that one compartment of said cabinet contains a plurality of disconnecting and protective devices and bus bars; that a plurality of individual compartments of said cabinet each contains a magnetically operated operating device; that the front of said cabinet is provided with covers to close said compartments; that a compartment is associated with said cabinet which houses a plurality of control devices for selectively operating said operating devices; and that said cabinet is provided with tapped connections for conduit conductors to accommodate wiring running from the supply source to the bus bars and outgoing wiring running from the various operating devices to the various power consuming devices.

6. Apparatus for industrial plants having a plurality of medium or low voltage motors and other power consuming devices arranged to be controlled and supplied with power from a common point, said apparatus comprising a cabinet having a plurality of separate compartments, one compartment having bus bars and a multitude of branch disconnecting and protective devices therein, a plurality of said compartments each having a magnetically operated switch therein for controlling a motor or power consuming device, and one compartment having a multitude of control switches for said magnetically operated switches, said cabinet containing all necessary wiring for connecting the bus bars, disconnecting and protective devices, operating devices and control switches in operative circuit relationship, and being provided with doors for tightly closing the compartment thereof to exclude dust, dirt, and moisture from the apparatus therein contained.

FRED J. BUCHER.